United States Patent [19]
Kimura et al.

[11] Patent Number: 5,406,792
[45] Date of Patent: Apr. 18, 1995

[54] QUICK ACCELERATION FLUID COUPLING

[75] Inventors: Katsumi Kimura; Ryuji Sakai; Hiroshi Ogata; Kazuo Hattori; Michio Ohtsuka, all of Kanagawa, Japan

[73] Assignee: Ebara Corporation, Tokyo, Japan

[21] Appl. No.: 113,361

[22] Filed: Aug. 30, 1993

Related U.S. Application Data

[63] Continuation of Ser. No. 913,196, Jul. 14, 1992, abandoned.

[30] Foreign Application Priority Data

Jul. 16, 1991 [JP] Japan .................................. 3-175510

[51] Int. Cl.6 ............................................. F16D 33/06
[52] U.S. Cl. .......................................... 60/357; 60/361
[58] Field of Search .................. 60/330, 347, 353, 354, 60/357, 358, 359, 360, 361, 331, 332, 334, 335, 348, 352

[56] References Cited

U.S. PATENT DOCUMENTS

| | | | |
|---|---|---|---|
| 2,432,191 | 12/1947 | Chilton | 60/360 |
| 2,689,458 | 9/1954 | Weymann | 60/359 |
| 2,878,642 | 3/1959 | Maurice et al. | 60/360 |
| 3,146,595 | 9/1964 | Deitrickson | 60/348 |
| 3,324,650 | 6/1967 | Staudenmaier | 60/348 |
| 4,023,362 | 5/1977 | Rogner et al. | 60/357 X |
| 4,662,175 | 5/1987 | Wahl et al. | 60/357 X |

FOREIGN PATENT DOCUMENTS

| | | | |
|---|---|---|---|
| 2573151 | 5/1986 | France . | |
| 3240179 | 6/1983 | Germany . | |
| 3531987 | 4/1987 | Germany . | |
| 48-46752 | 7/1973 | Japan . | |
| 50-61569 | 5/1975 | Japan . | |
| 52-1460 | 1/1977 | Japan . | |
| 53-140467 | 12/1978 | Japan . | |
| 0069351 | 5/1980 | Japan | 60/357 |
| 57-129932 | 8/1982 | Japan . | |
| 3-260421 | 11/1991 | Japan . | |
| 241838 | 4/1969 | U.S.S.R. | 60/357 |

*Primary Examiner*—Edward K. Look
*Assistant Examiner*—Hoang Nguyen
*Attorney, Agent, or Firm*—Armstrong, Westerman, Hattori, McLeland & Naughton

[57] ABSTRACT

A quick acceleration fluid coupling comprising: a fluid coupling working chamber defined by an impeller attached to a driving shaft, a runner attached to a driven shaft, and an impeller casing attached to the impeller and surrounding the runner; and a passage for supplying hydraulic oil into the fluid coupling working chamber; wherein the passage includes a control valve operable to be fully opened and closed rapidly, and a bypass passage having an oil control orifice, which bypasses the control valve; thereby the rotational speed of the driven shaft can be changed rapidly from the lowest to the highest or vice versa.

12 Claims, 10 Drawing Sheets

QUICK ACCELERATION FLUID COUPLING

This application is a continuation application Ser. No. 07/913,196 filed Jul. 14, 1992, now abandoned.

BACKGROUND OF THE INVENTION

1. Field of the Invention

The present invention relates to a fluid coupling having a quick acceleration and deceleration mechanism.

2. Prior Art

Conventional fluid couplings include a fixed charge type coupling in which the circuit is filled with a fluid (hydraulic oil) at all times during operation, and a variable charge type coupling in which the amount of fluid (hydraulic oil) in the circuit is variable to allow a change in transfer torque capacity. Variable charge type fluid couplings include a variable speed type and an oil charge-discharge type.

Figure 10A:
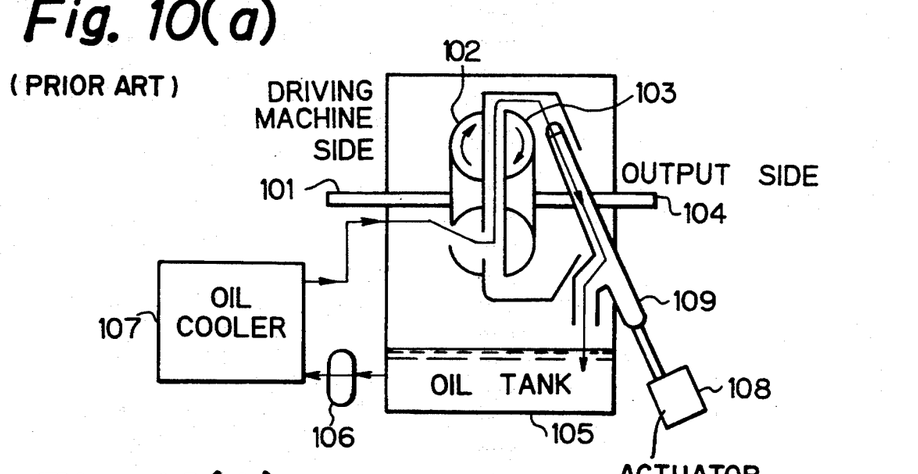

FIG. 10(a) is a schematic representation of the above-described variable speed type fluid coupling. The coupling comprises an impeller (pump impeller) 102 connected to a driving shaft 101, and a runner (turbine impeller) 103 connected to a driven shaft 104 in opposing relation to the impeller 102 to form a fluid circuit. Hydraulic oil in the circuit circulates through an oil tank 105, an oil pump 106 and an oil cooler 107, and it can be partly replaced (increased or decreased) through a scoop tube 109 that is controlled through an actuator 108.

This type of fluid coupling functions for the purpose of controlling the number of revolutions (i.e., rotational speed) of the driven side and of no-load starting of an electric motor on the driving side and enables a lowering in the running cost and also a lowering in the driving machine cost.

Figure 10B:
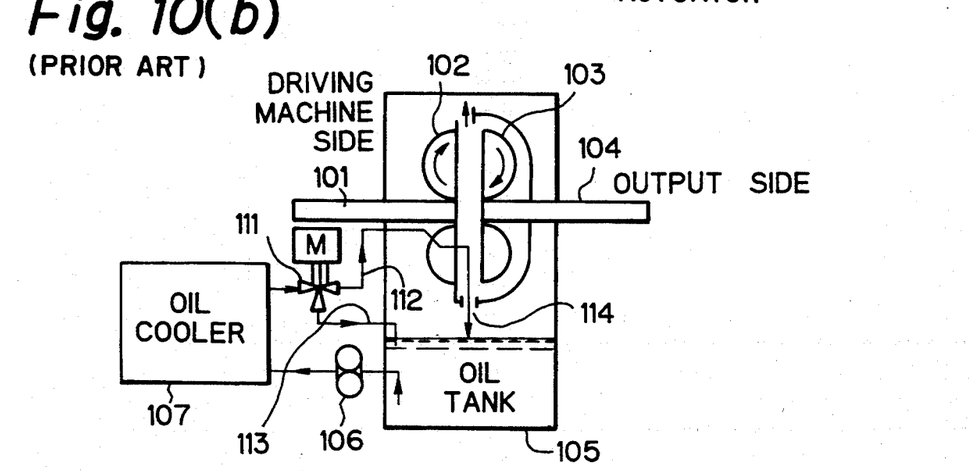

FIG. 10(b) shows schematically the above-described oil charge-discharge type fluid coupling, in which hydraulic oil in the circuit circulates through an oil charge-discharge switching valve 111 connected to the outlet of the oil cooler 107, and oil is charged through a replenishment pipe 112 extending into the circuit and discharged through a return pipe 113 extending into the oil tank 105. The oil in the circuit is constantly returned to the oil tank 105 at a predetermined flow rate through a nozzle 114.

This type of fluid coupling functions to cut off power (clutch action), absorb torsional vibration, effect no load starting of a prime mover and reduce starting resistance, and enables individual operation of an engine, on-off operation of a driven machine, easy starting and acceleration of a prime mover, etc.

Figure 10C:
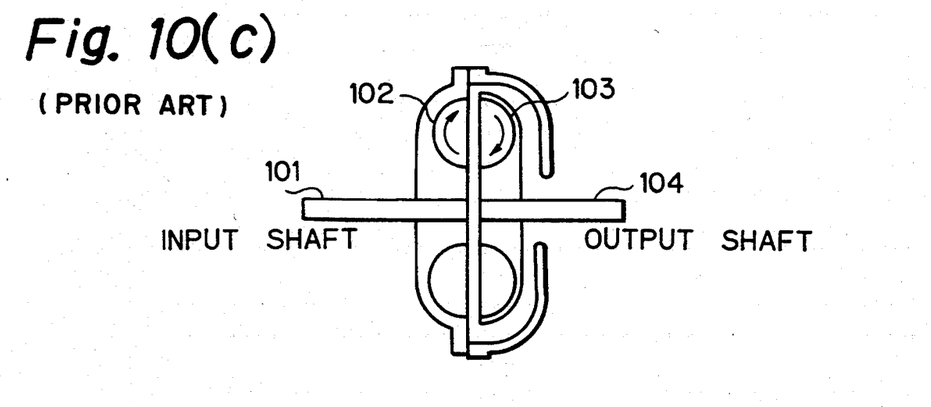

FIG. 10(c) shows schematically the above-described fixed speed (fixed charge type) fluid coupling, which is designed to operate with the circuit filled with a fluid at all times. This type of fluid coupling functions for the purpose of reducing the starting resistance, lessening and absorbing vibration and impact and absorbing torsional vibration and also functions as a torque limiter, and it functions to protect an electric motor and machine connected thereto.

The conventional variable speed type fluid coupling (shown in FIG. 10(a)) enables a desired rotational speed to be set over a wide controllable range by varying the position of the scoop tube 109 and is therefore suitable for a multi-point operation. However, since the moving of the scoop tube 109 is relatively slow, the acceleration response speed, that is, the time needed to increase the rotational speed from its lowest to highest, of this type of fluid coupling is relatively slow, e.g. about 10 seconds at its fastest.

The oil charge-discharge type fluid coupling (shown in FIG. 10(b)) allows the rotational speed to be changed over between two points, i.e., the highest rotational speed and the lowest rotational speed, by opening and closing the oil charge-discharge switching valve 111 and is therefore suitable for sole operation of a driving machine and an on-off operation of a driven machine. However, since the hydraulic oil is discharged from the nozzle 114, provided at the outer periphery of the hydraulic oil chamber, at all times during the operation of the driven machine, it leads to a lowering in the efficiency in the case of a small-sized fluid coupling. In addition, since the amount of hydraulic oil discharged from the nozzle 114 is limited, the acceleration-deceleration response speed is slow. Therefore, this type of fluid coupling cannot be applied to uses where a fast acceleration-deceleration response speed is required.

The fixed speed fluid coupling (shown in FIG. 10(c)) is suitable mainly for absorbing and reducing impact force but is unable to control the rotational speed.

Accordingly, if a fluid coupling having any of the conventional structures is applied to an intermittently operating apparatus, for example, a descaling pump used to remove scales from the surface of a steel material being manufactured in an iron works, there is a great practical difficulty involved because response to the speed change is slow. For this reason, it has heretofore been conventional practice to rotate the driven shaft continuously at its highest rotational speed during a no-load operation and to throttle the flow of hydraulic oil using a valve or the like.

SUMMARY OF THE INVENTION

A first object of the present invention is, therefore, to solve the above-described problems of the prior art and markedly improve on the response time in rotational speed in a change from its lowest to highest speed and vice versa by using a quick acceleration mechanism of a fluid coupling.

A second object of the present invention is to prevent application of a load exceeding an allowable value to a driving machine (i.e., an electric motor) resulting from an increased acceleration torque in a case where the rotational speed is increased from its lowest rotational speed to its highest rotational speed to thereby markedly shorten the above-described response time.

To attain the first object, the present invention provides a quick acceleration fluid coupling comprising; a fluid coupling working chamber defined by an impeller attached to a driving shaft, a runner attached to a driven shaft, and an impeller casing attached to said impeller and surrounding said runner; and a passage for supplying hydraulic oil into said fluid coupling working chamber; wherein said passage includes a control valve operable to be fully opened and closed rapidly, and a bypass passage having an oil control orifice, which bypasses said control valve; thereby the rotational speed of said driven shaft can be changed rapidly from its lowest to its highest speed or vice versa.

A dam may be provided on an inner surface of the impeller casing inwardly of an oil discharge nozzle provided in the impeller casing so that a lowest rotational speed can be set as desired. It is also possible for a plurality of small notches to be provided in the innermost periphery of the lowest speed setting dam so that the lowest rotational speed can be subject to minute variations.

To attain the second object, the present invention provides a quick acceleration fluid coupling comprising; a fluid coupling working chamber defined by an impeller attached to a driving shaft, a runner attached to a driven shaft, and an impeller casing attached to said impeller and surrounding said runner; a passage For supplying hydraulic oil into said fluid coupling working chamber, wherein said passage includes a control valve operable to be fully opened and closed rapidly and a bypass passage having an oil control orifice, which bypasses said control valve, wherein said impeller casing includes an oil discharge nozzle for discharging oil from said fluid coupling working chamber to the outside thereof; and a dam provided on an inner surface of said impeller casing inwardly of said oil discharge nozzle for setting the lowest rotational speed of said driven shaft, wherein the height of said dam is set so that a driving machine of said coupling will not exceed its load carrying capacity limit due to acceleration torque generated when the rotational speed is changed from its lowest to its highest speed.

The second object can also be attained by a quick acceleration fluid coupling comprising; a fluid coupling working chamber defined by an impeller attached to a driving shaft, a runner attached to a driven shaft, and an impeller casing attached to said impeller and surrounding said runner; a passage for supplying hydraulic oil into said fluid coupling working chamber, wherein said passage includes a control valve operable to be fully opened and closed rapidly and a bypass passage having all oil control orifice, which bypasses said control valve, wherein said control valve is arranged to make it possible to set a rate of supply of oil into said working chamber so that a driving machine will not exceed its load carrying capacity limit due to acceleration torque generated when the rotational speed is changed rapidly from its lowest to its highest speed.

According to the first invention of this application, no hydraulic oil is supplied into the working chamber when the fluid coupling is at rest before being started.

Next, when the driving side, which comprises the driving shaft, the impeller and the impeller casing, is rotated and hydraulic oil is supplied into the working chamber through the bypass passage having the oil control orifice with the control valve being fully closed, it transmits power to the driven machine side through the oil control orifice in the bypass passage, so that the rotational speed of the driven machine is at its lowest. In case the lowest speed setting dam is provided, the lowest rotational speed of the driven machine is set by the height of the dam.

Next, when the control valve is fully and rapidly opened, hydraulic oil is supplied rapidly to the working chamber through both the control valve and the bypass passage, so that the rotational speed of the driven machine reaches its highest speed within a very short time, e.g. 4 to 5 seconds.

When the rotational speed is increased from the lowest to the highest as described above, acceleration torque is applied to the driving machine, so that the load limit of the driving machine may be exceeded and this may lead to overload of the driving machine.

However, according to the second invention of this application, since the height of the lowest speed setting dam provided on the impeller casing is increased to lower the acceleration torque, the driving machine will not exceed its load carrying capacity limit as a result of the acceleration torque. Alternatively, the open-close speed of the control valve or the size of the oil control orifice may be changed according to the circumstances to set a rate of supply of hydraulic oil into the working chamber so that the driving machine will not exceed its load carrying capacity limit due to the acceleration torque.

The above and other objects, features and advantages of the present invention will become more apparent from the following description when taken in conjunction with the accompanying drawings in which preferred embodiment of the present invention is shown by way of illustrative examples.

BRIEF DESCRIPTION OF THE DRAWINGS

FIG. 5($a$) is a vertical sectional view of a fluid coupling having a different lowest speed setting dam according to another embodiment off the present invention;

FIG. 5($b$) is a side view of the dam;

FIGS. 10($a$), 10($b$) and 10($c$) respectively show conventional fluid coupling.

DETAILED DESCRIPTION OF THE INVENTION

Embodiments of the present invention will be described below with reference to the accompanying drawings.

Figure 1:
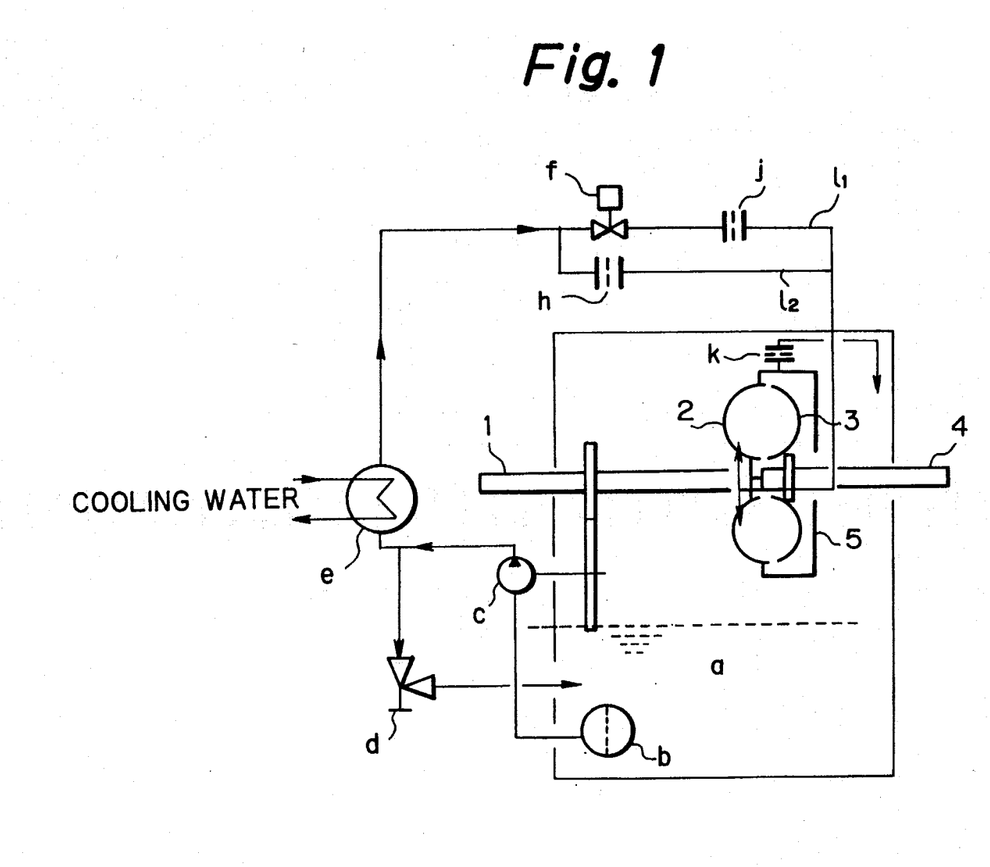
FIG. 1 shows a hydraulic oil supply circuit of a fluid coupling according to one embodiment of the present invention.
Figure 2:
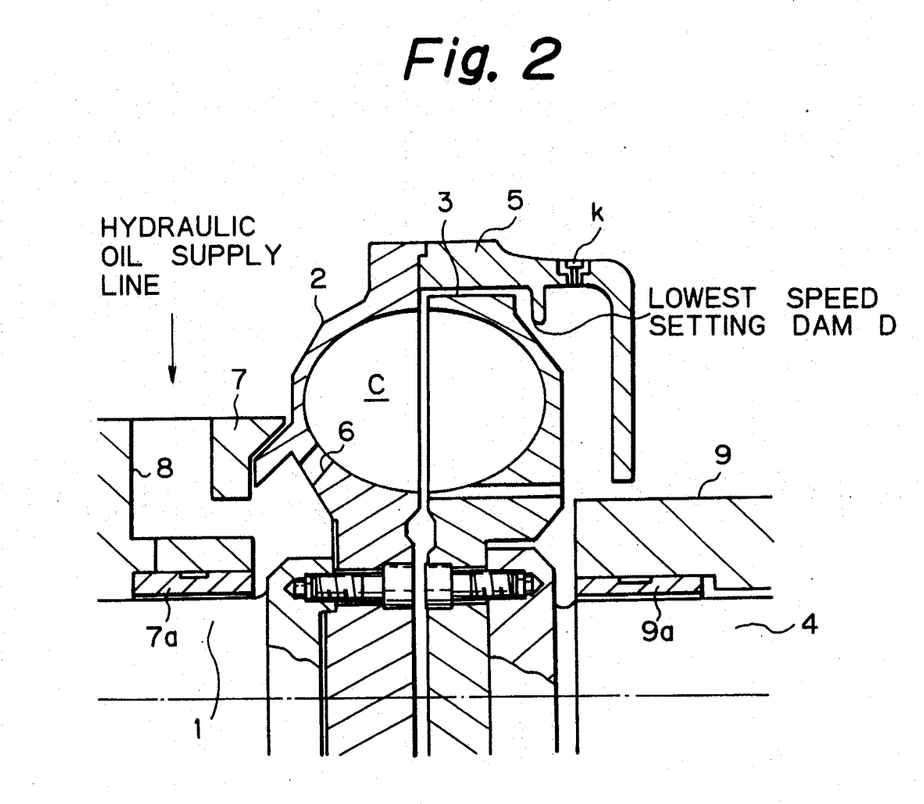
FIG. 2 is a vertical sectional view showing the fluid coupling which is at rest before it is started.

FIG. 1 shows a hydraulic oil supply circuit of a fluid coupling according to one embodiment of the present invention, and FIG. 2 is a vertical sectional view showing the structure of the fluid coupling.

Referring to FIG. 2, an impeller 2 is attached to a driving shaft 1, and a runner 3 is attached to a driven shaft 4 in opposing relation to the impeller 2 to constitute a fluid circuit. An impeller casing 5 that surrounds the outer periphery of the runner 3 is attached to the impeller 2 and has a nozzle k provided in the outer peripheral wall portion thereof to discharge hydraulic oil to the outside. A dam D for setting the lowest speed is formed on the inner wall surface of the casing 5 at the inner side of the position where the nozzle k is provided.

In the meantime, the impeller 2 has a hydraulic oil supply hole 6 provided in the radially inward portion thereof, the oil supply hole 6 being communicated with a passage 8 that is formed in a driving-side bearing casing 7 to connect with a hydraulic oil supply line. In the figure, reference numeral 9 denotes a driven-side bearing casing, and 7a and 9a bearing sliding members.

A working chamber C comprises the impeller 2, the runner 3 and the impeller casing 5. Hydraulic oil is supplied to the working chamber C through the hydraulic oil supply passage 8 in the bearing casing 7. The passage for supplying hydraulic oil into the working chamber C comprises a passage $l_1$ having a control valve f that is operable to fully open and close the passage rapidly and further having an oil control orifice j, and a passage $l_2$ having an oil control orifice h, which is provided in parallel to the passage $l_1$ so as to bypass the control valve f, as shown in FIG. 1. Hydraulic oil is supplied to the working chamber C from an oil tank a by an oil pump c through a strainer b, either the passage $l_1$ or $l_2$, the oil supply passage 8 in the driving-side bearing casing 7, and the oil supply hole 6. The oil in the working chamber C is discharged to the outside through the nozzle k. It should be noted that an oil pressure control relief valve d and an oil cooler e are installed according to need.

When the control valve f is fully open, the quantity of oil supplied to the working chamber C is determined by the oil control orifices j, h, whereas, when the control valve f is fully closed, it is determined by the oil control orifice h. Thus, when the control valve f is fully open, the driven-side rotational speed is the highest, whereas, when the control valve f is fully closed, the rotational speed is the lowest.

The operation will be explained below:

(i) When the device is at rest before being started, no hydraulic oil is supplied into the working chamber, as shown in FIG. 2.

Figure 6:
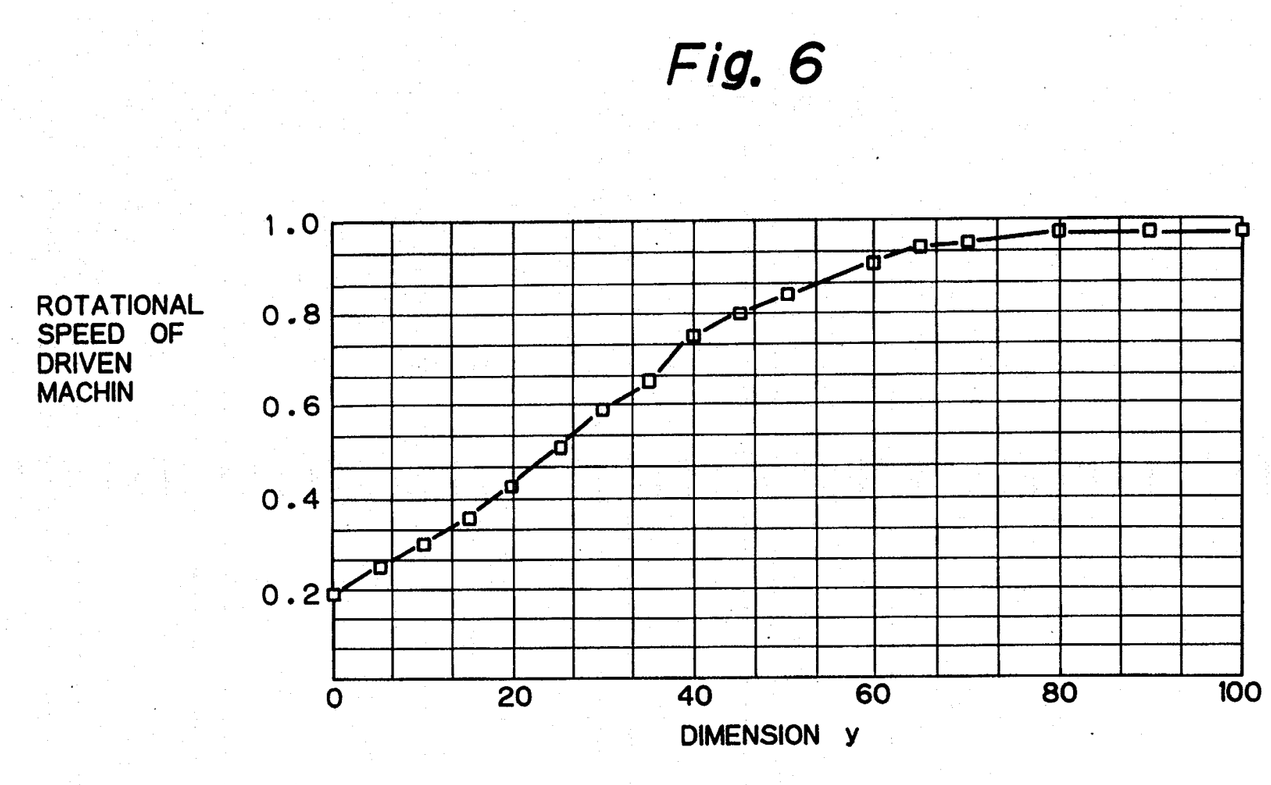
FIG. 6 is a graph showing the relationship between the heightwise dimension y of the lowest speed setting dam and the rotational speed of the driven machine.

(ii) Next, when the driving side, which comprises the driving shaft 1, the impeller 2 and the impeller casing 5, is rotated and the control valve f (shown in FIG. 1) is fully closed, hydraulic oil is supplied into the working chamber C via the oil control orifice h (shown in FIG. 1) and through the oil supply passage 8 in the bearing casing 7 and the oil supply hole 6. At this time, the quantity $Q_1$ of oil supplied is determined by the bore diameter of the oil control orifice h. The hydraulic oil supplied into the working chamber C transmits power to the driven machine side through the hydraulic oil held at the upstream side of the lower speed setting dam D. At this time, the rotational speed of the driven machine is the lowest. The lowest rotational speed of the driven machine can be set as desired by properly selecting the heightwise dimension y of the dam D shown in FIG. 3. The relationship between the rotational speed of the driven machine and the dimension y is such as that shown in FIG. 6, in which the former is plotted along the ordinate axis, and the latter along the abscissa axis. The quantity $Q_1$ of oil supplied at this time is calculated by $$Q_1 = q_1 + q_2 \quad (1)$$

where $Q_1$: the quantity of hydraulic oil supplied
$q_1$: the quantity of oil leaking from the nozzle k (see FIG. 8)
$q_2$: the quantity of oil leaking from the gap between the impeller 2 and the bearing casing 7

Figure 4:
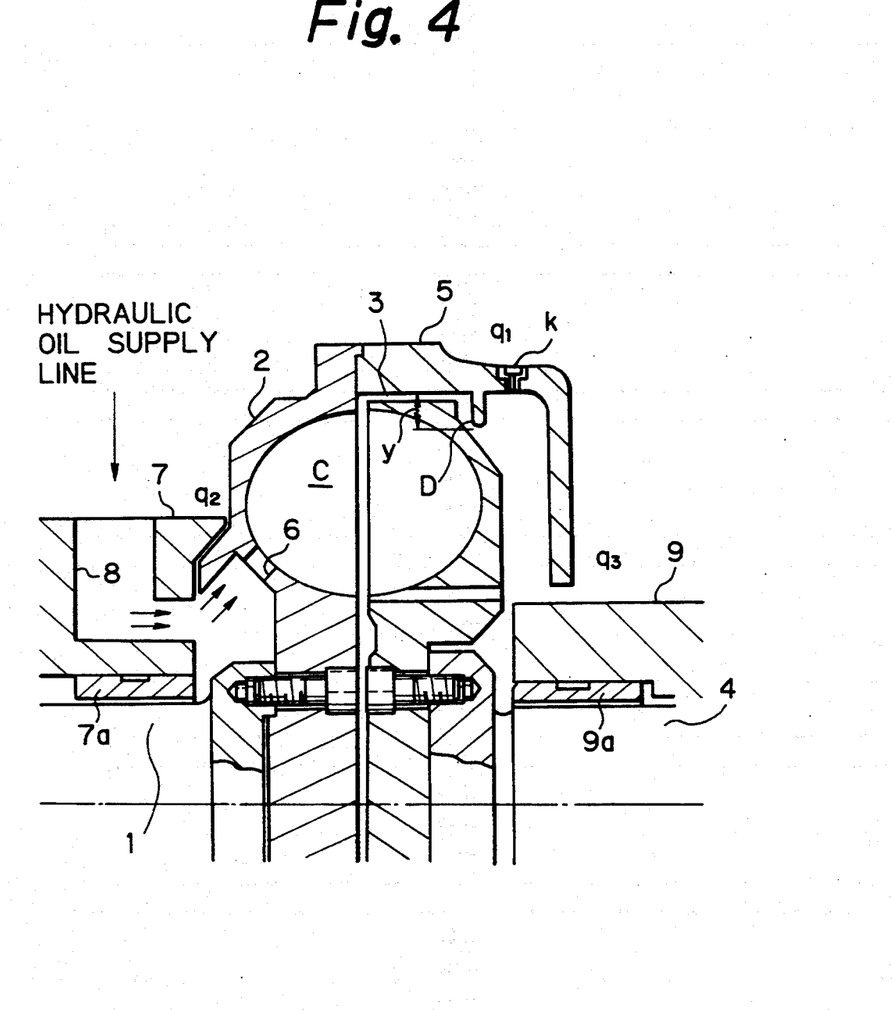
FIG. 4 shows the fluid coupling in a state where the rotational speed of the driven machine is the highest.

(iii) Next, when the driving side is rotating and the control valve f is fully open, the hydraulic oil is supplied into the working chamber C via both the oil control orifices j and h (shown in FIG. 1) and through the oil supply passage 8 in the bearing casing 7 and the oil supply hole 6, as shown in FIG. 4. The quantity $Q_2$ of oil supplied is determined by the bore diameters of the oil control orifices j and h. In this state, the working chamber is filled with hydraulic oil, and the hydraulic oil is constantly flowing out from the nozzle k, provided in the impeller casing 5, and from the gap between the impeller 2 and the bearing casing 7 ($q_1$ and $q_2$). In this state, the rotational speed of the driven machine is the highest, and the quantity $Q_2$ of oil supplied at this time is calculated by $$Q_2 = q_1 + q_2 + q_3 = q_1 + q_2 + V/t \quad (2)$$

where $Q_2$: the quantity of hydraulic oil supplied
V: the internal volume of the working chamber
$q_1$: the quantity of oil leaking from the nozzle k
$q_2$: the quantity of oil leaking from the gap between the impeller 2 and the bearing casing 7
$q_3$: the quantity of oil leaking from the gap between the impeller casing 5 and the bearing casing 9
t: the working chamber filling time As has been described above, it is possible to effect on-off control of the rotational speed of the driven machine between the lowest and the highest by fully opening and closing the control valve F and setting the oil control orifices h and j. In this case, since the internal volume V is known, if a rate (V/t) of oil supplied to the working chamber with respect to a desired time t is selected, it is possible to obtain a desired response time for rotational speed change from the lowest to the highest. However, when the rotational speed is increased from the lowest to the highest, the acceleration torque Ta represented by the following expression (3) is applied to the driving machine, so that the load carrying capacity limit of the driving machine may be exceeded, which may lead to a burning accident of the driving machine:

$$Ta = GD^2 \times (N_2 - N_1)/375 \times t \quad (3)$$

where

Ta: acceleration torque
$GD^2$: $GD^2$ of (the fluid coupling driven side + the driven machine) ($GD^2$: Flywheel moment of a rotor, G: weight [Kg] of a rotor, D: diameter [m] of a rotor)
$N_2$: the highest rotational speed
$N_1$: the lowest rotational speed
t: acceleration time (hydraulic oil supply time)

The second invention of this application aims at preventing the above-described burning accident. That is, in the above expression (3), the lowest rotational speed $N_1$ is increased by increasing the dimension y of the dam D shown in FIG. 3 to thereby reduce ($N_2 - N_1$), and thus lowering the acceleration torque Ta. Alternatively, the acceleration time t may be increased to thereby lower the acceleration torque Ta. In the latter case, the acceleration time t may be increased by changing the bore diameters of the oil control orifices j and h shown in FIG. 1, or by changing the open-close speed of the control valve f.

Figure 5A:
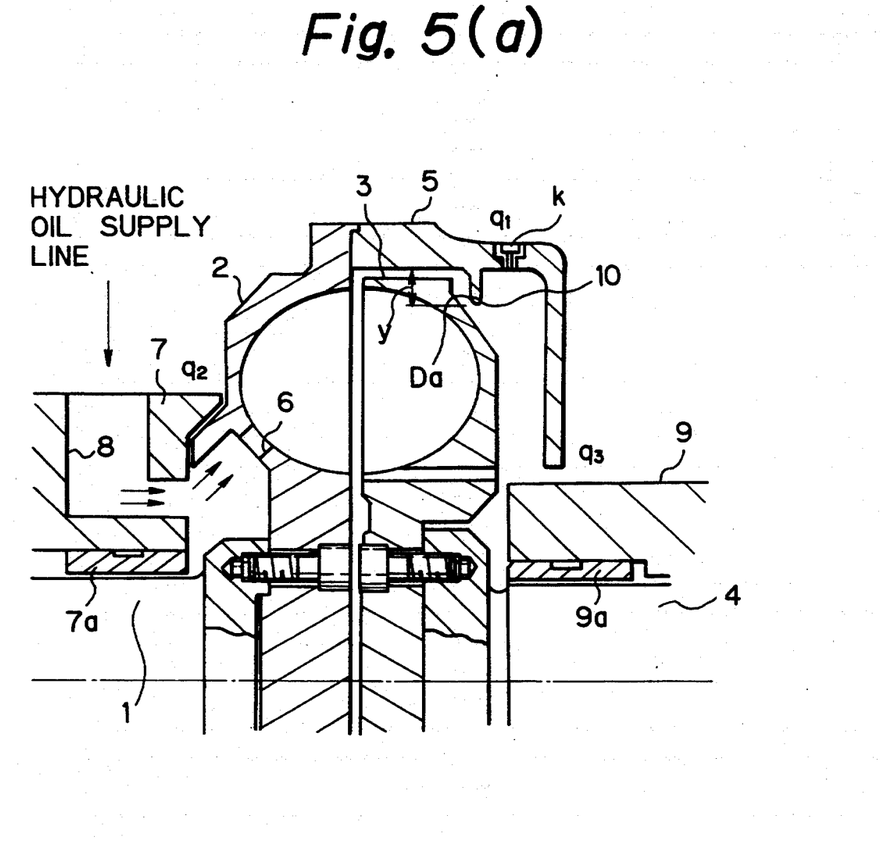
Figure 5B:
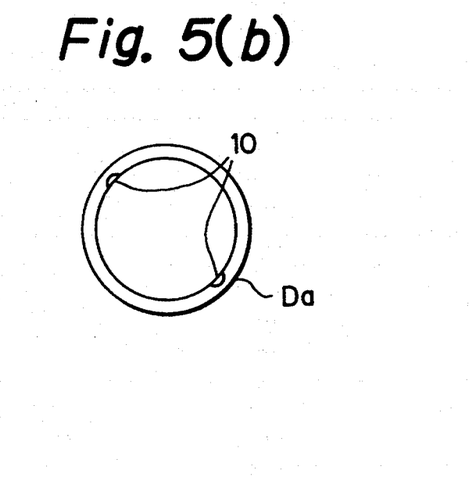

FIG. 5(a) is a vertical sectional view of a fluid coupling having a lowest speed setting dam Da which is arranged to enable the lowest speed to be changed minutely, and FIG. 5(b) is a side view of the dam Da (the whole circumference). The dam Da has an even number of small semicircular notches 10 provided in the innermost periphery thereof at respective positions of central symmetry.

Figure 3:
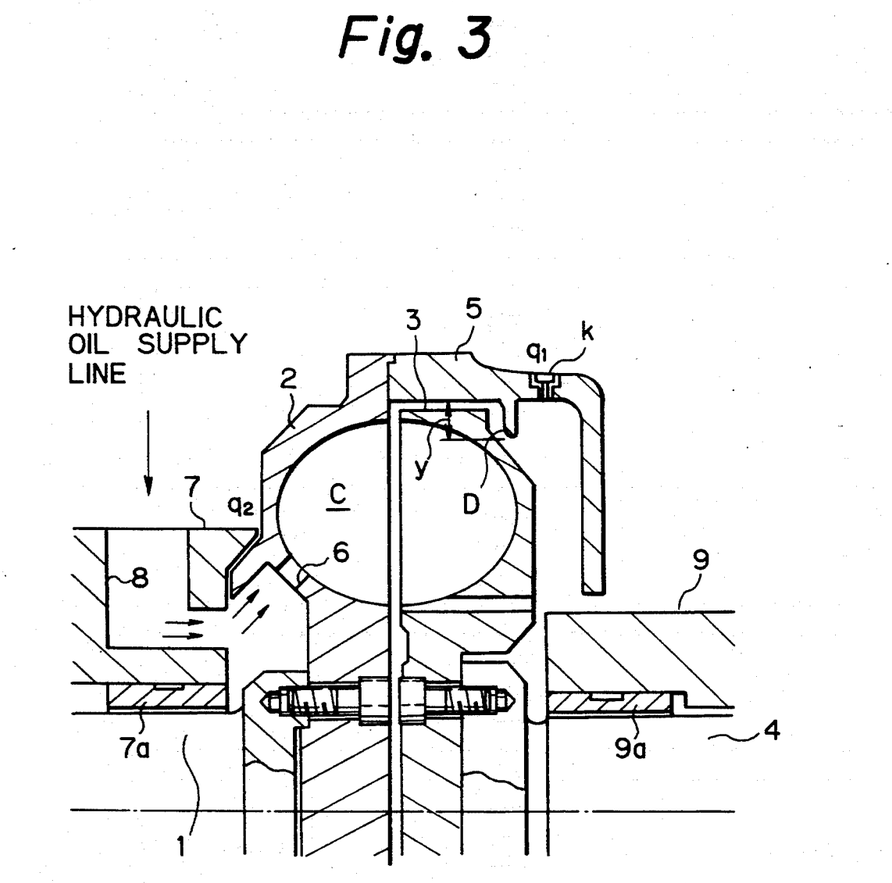
FIG. 3 shows the fluid coupling in a state where the rotational speed of a driven machine is the lowest.

It is very difficult to minutely alter the lowest rotational speed $N_1$ simply by changing the dimension y of the dam D shown in FIG. 3. The reason for this is as follows. When the hydraulic oil overflowing the dam D is discharged to the outside of the working chamber through the nozzle k, the lowest rotational speed is greatly affected by the oil film thickness of the overflowing oil. However, the oil film thickness of the overflowing oil is greatly affected by the height y of the dam D. In the embodiment shown in FIG. 5, however, the dam Da has an even number of small semicircular notches 10 provided in the innermost periphery thereof at centrally symmetrical positions as described above. Therefore, by changing the size of the notches 10, the flow rate of oil passing through the notches 10 is varied, and it is possible to minutely control the oil film thickness of the overflowing oil and hence possible to change the lowest speed minutely. Thus, the lowest speed can be set as designed.

Figure 7:
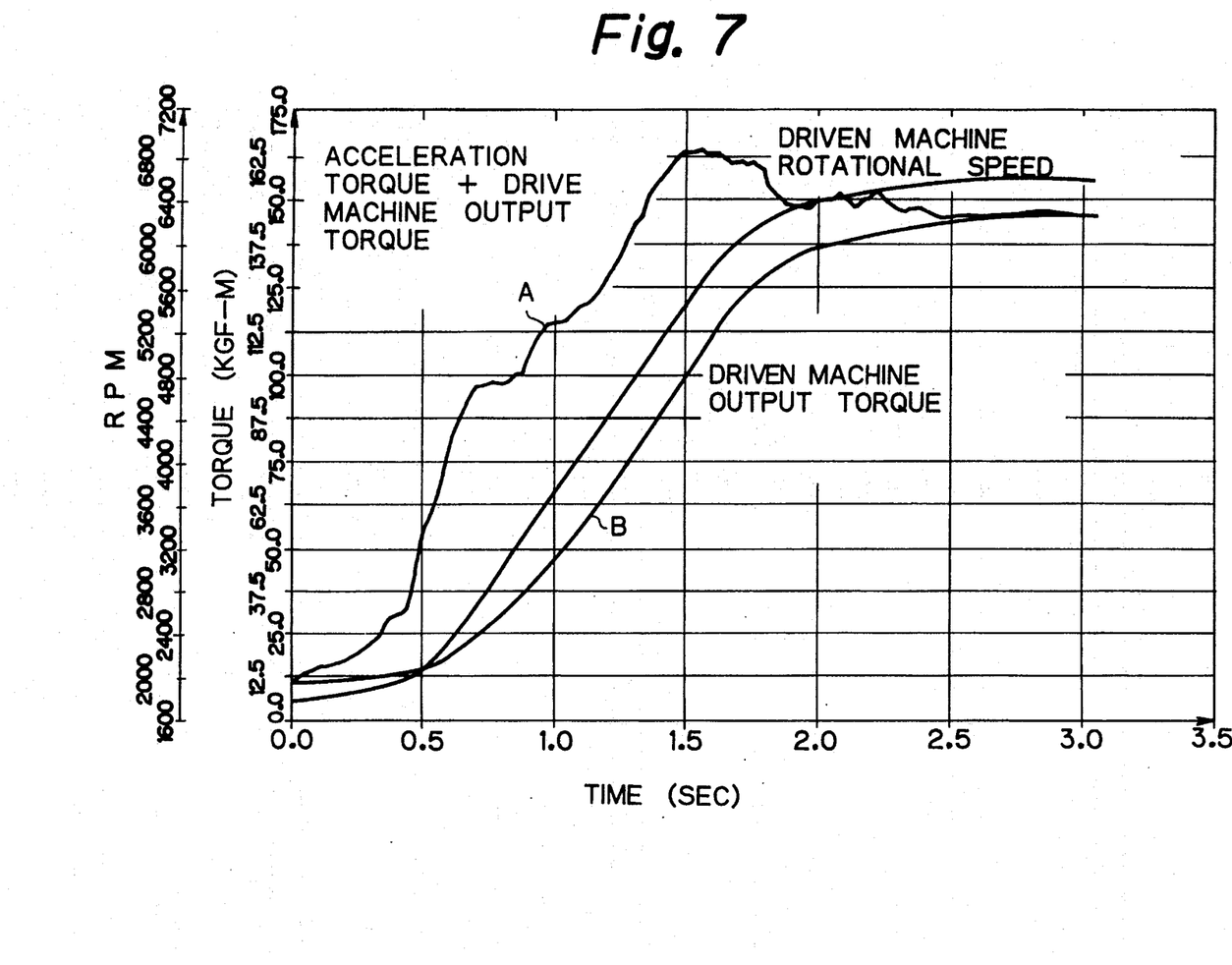
FIG. 7 is a graph showing response characteristics of the coupling of the invention obtained when the hydraulic oil supply time is 3 seconds.
Figure 8:
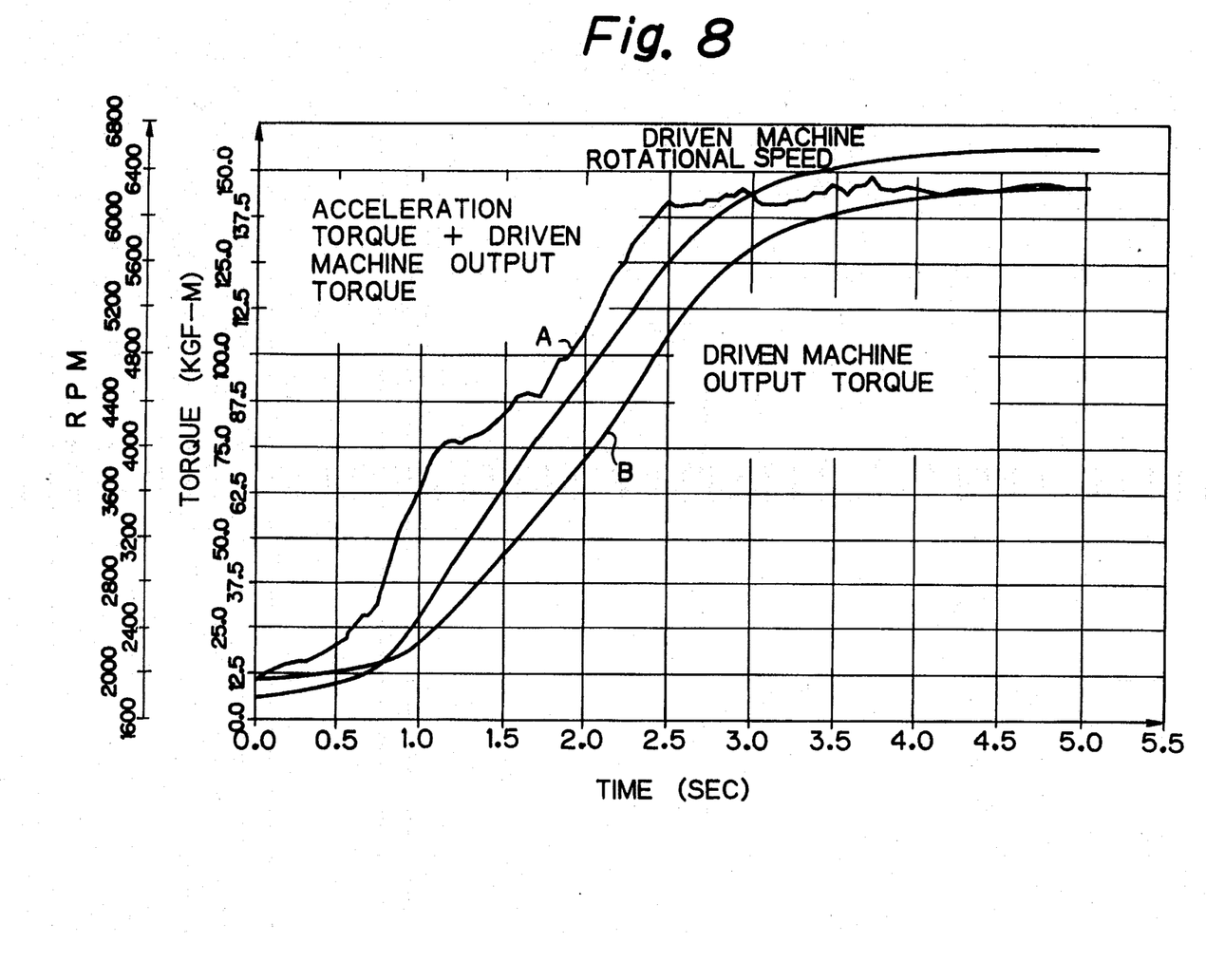
FIG. 8 is a graph showing response characteristics of the coupling of the invention obtained when the hydraulic oil supply time is 5 seconds.

FIGS. 7 and 8 are graphs showing the results of calculation wherein response characteristics of the driven machine rotational speed, the driven machine output torque and the sum of the driven machine output torque and the acceleration torque (ordinate axis) were obtained for different periods of time to supply hydraulic oil into the impeller working chamber, i.e., 3 seconds and 5 seconds (abscissa axis). In this case, although the conditions of $GD^2$, the lowest rotational speed $N_1$ and the highest rotational speed $N_2$ in the two examples are the same, the acceleration torque (the difference between lines A and B in FIGS. 7 and 8) increases in inverse proportion to the acceleration time. The sum of the acceleration torque and the driven machine output torque shown in each graph is the load applied to the driving machine, and the acceleration time (hydraulic oil supply time) t and the lowest rotational speed $N_1$ must be set so that the load will not exceed the load carrying capacity limit of the driving machine.

In both the examples shown in FIGS. 7 and 8, the dimension y of the dam D is determined so that the lowest rotational speed is 1,775 r.p.m., and the highest rotational speed is set at 6,597 r.p.m. For the hydraulic oil supply time of 3 seconds and 5 seconds, the acceleration torque is almost halved, and the acceleration response time is about 3.1 seconds and 5.1 seconds. Thus, the response speed is improved by a large margin in comparison with the conventional scoop tube system (shown in FIG. 10(a)).

Figure 9:
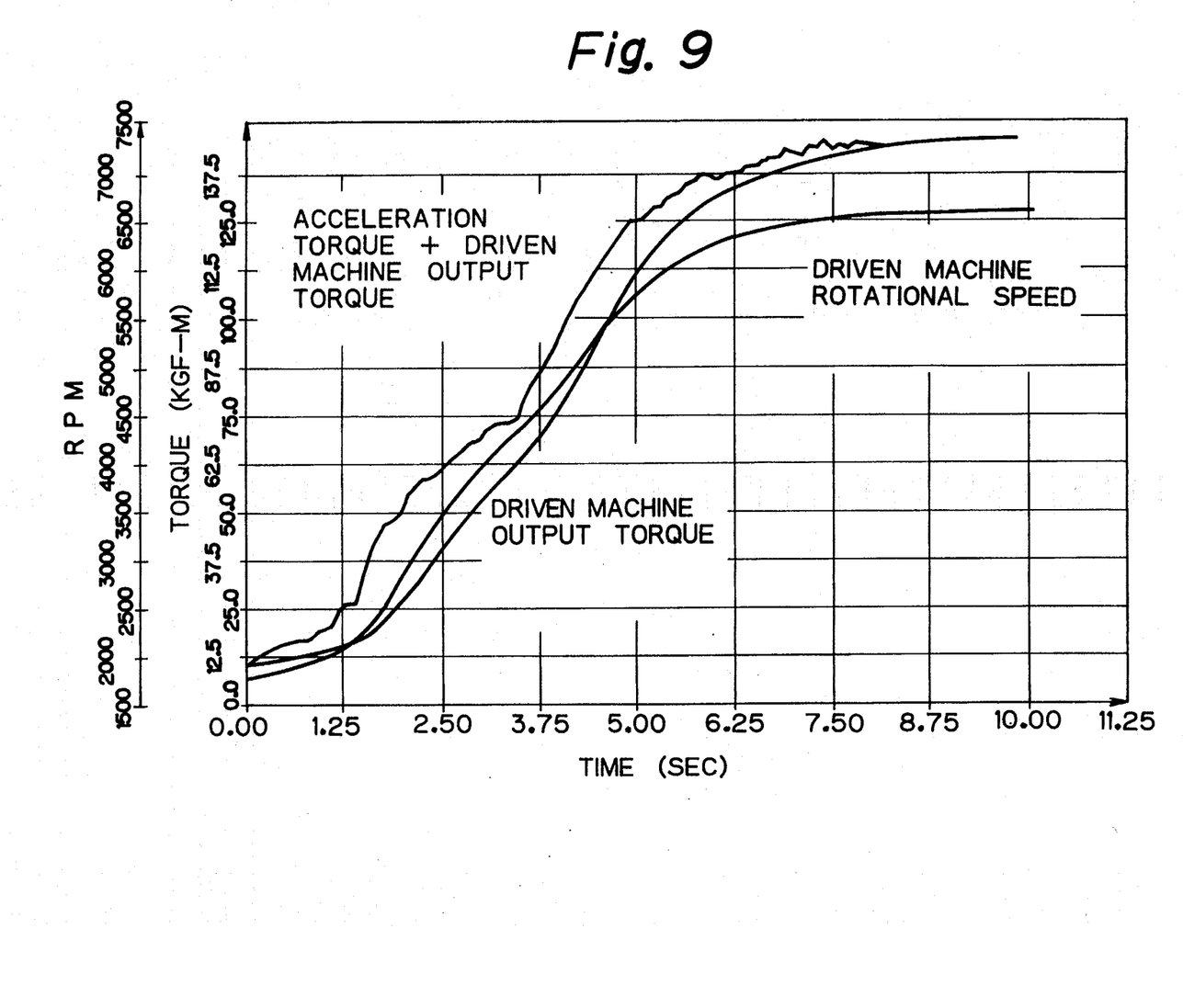
FIG. 9 is a graph showing response characteristics of the prior art.

FIG. 9 shows the response characteristics of the prior art, i.e., scoop tube system. In this example, although the lowest and highest rotational speeds are set at 1,775 r.p.m. and 6,597 r.p.m., respectively, in the same way as in the examples shown in FIGS. 7 and 8, since the scoop tube moving time is 10 seconds, the acceleration response time also needs about 10 seconds. If the dead time and the response lag of first order are taken into consideration in the above examples, the actual acceleration response time may be about 1 second longer than the above-described acceleration response time in each example.

Thus, according to the invention of this application, since a passage for supplying hydraulic oil into a fluid coupling working chamber defined by an impeller, a runner and an impeller casing is provided with a control valve that is operable to be fully opened and closed rapidly and further provided with a bypass passage having an oil control orifice, which bypasses the control valve, the response time in rotational speed change from the lowest to the highest and vice versa can be greatly shortened.

In case a dam is provided inwardly of an oil discharge nozzle provided in the impeller casing, the lowest rotational speed can be set in accordance with the usage by changing the configuration of the dam. Accordingly, even a driven machine that frequently repeats a loaded operation and a no-load operation, for example, a pump for a descaling apparatus, can be run at the lowest rotational speed during the no-load operation. Thus, great energy saving effectiveness is obtained with simple control.

In addition, the lowest rotational speed can be changed minutely by providing small notches in the innermost periphery of the lowest speed setting dam.

Further, overload of a driving machine can be prevented by setting the height of the lowest speed setting dam or the open-close speed of the control valve or the size of the oil control orifice so that the driving machine will not exceed its load carrying capacity limit due to the acceleration torque generated when the rotational speed is increased rapidly from its lowest to highest speed.

What is claimed is:

1. A quick acceleration fluid coupling, comprising:
a fluid coupling working chamber including,
   (a) an impeller attached to a driving shaft,
   (b) a runner attached to a driven shaft, and
   (c) an impeller casing attached to said impeller and surrounding said runner; and
a passage for supplying hydraulic oil into said fluid coupling working chamber, wherein said passage includes,
   (a) a switching valve means selectably operable for fully opening and closing at high speed, and
   (b) a bypass passage having an oil control orifice, which bypasses said switching valve means, for selectively and rapidly changing the rotational speed of said driven shaft from a lowest speed to a highest speed or vice versa according to the operation of said switching valve means.

2. A quick acceleration fluid coupling, comprising:
a fluid coupling working chamber including:
   (a) an impeller attached to a driving shaft;
   (b) a runner attached to a driven shaft; and
   (c) an impeller casing attached to said impeller and surrounding said runner, wherein said impeller casing comprises an oil discharge nozzle for discharging oil from said fluid coupling working chamber to the outside thereof, and a dam disposed on an inner surface of said impeller casing inwardly of said oil discharge nozzle, whereby the lowest rotational speed of said driven shaft is set as desired; and
a passage for supplying hydraulic oil into said fluid coupling working chamber, wherein said passage includes:
   (a) a switching valve means operable for fully opening and closing rapidly; and
   (b) a bypass passage having an oil control orifice, which bypasses said switching valve means for rapidly changing the rotational speed of said driven shaft from a lowest speed to a highest speed or vice versa.

3. A quick acceleration fluid coupling according to claim 2, wherein a plurality of small notches are provided in an innermost periphery of said dam.

4. A quick acceleration fluid coupling according to claim 3, wherein said notches are each semicircular in shape and are positioned symmetrically with respect to a center of said dam.

5. A quick acceleration fluid coupling comprising:
a fluid coupling working chamber including,
(a) an impeller attached to a driving shaft,
(b) a runner attached to a driven shaft, and
(c) an impeller casing attached to said impeller and surrounding said runner, said impeller casing including an oil discharge nozzle for discharging oil from said fluid coupling working chamber to the outside thereof;
a passage for supplying hydraulic oil into said fluid coupling working chamber, wherein said passage includes,
(a) a switching valve means selectably operable for fully opening and closing rapidly, and
(b) a bypass passage having an oil control orifice, which bypasses said switching valve means; and
a dam provided on an inner surface of said impeller casing inwardly of said oil discharge nozzle for setting the lowest rotational speed of said driven shaft, wherein the height of said dam is set so that a driving machine of said coupling does not exceed its load carrying capacity limit due to acceleration torque generated when the rotational speed of said driven shaft is changed from its lowest to highest speed.

6. A quick acceleration fluid coupling comprising:
a fluid coupling working chamber including,
(a) an impeller attached to a driving shaft,
(b) a runner attached to a driven shaft, and
(c) an impeller casing attached to said impeller and surrounding said runner; and
a passage for supplying hydraulic oil into said fluid coupling working chamber, wherein said passage includes a switching valve means selectably operable for fully opening and closing rapidly, and a bypass passage having an oil control orifice, which bypasses said switching valve means, and further wherein said switching valve means sets a rate of supply of oil into said working chamber so that a driving machine does not exceed its load carrying capacity limit due to acceleration torque generated when the rotational speed of said driven shaft is changed rapidly from its lowest to its highest speed according to the operation of said switching valve means.

7. A quick acceleration fluid coupling used for a pump for a descaling apparatus, comprising:
a fluid coupling working chamber including,
(a) an impeller attached to a driving shaft,
(b) a runner attached to a driven shaft, and
(c) an impeller casing attached to said impeller and surrounding said runner; and
a passage for supplying hydraulic oil into said fluid coupling working chamber, wherein said passage includes,
(a) a switching valve means selectably operable for fully opening and closing rapidly, and
(b) a bypass passage having an oil control orifice, which bypasses said switching valve means, for selectively and rapidly changing the rotational speed of said driven shaft from a lowest speed to a highest speed or vice versa according to the operation of said switching valve means.

8. A quick acceleration fluid coupling used for a pump for a descaling apparatus, comprising:
a fluid coupling working chamber, including,
(a) an impeller attached to a driving shaft,
(b) a runner attached to a driven shaft, and
(c) an impeller casing attached to said impeller and surrounding said runner, said impeller casing including an oil discharge nozzle for discharging oil from said fluid coupling working chamber to the outside thereof, and a dam disposed on an inner surface of said impeller casing inwardly of said oil discharge nozzle, whereby the lowest rotational speed of said driven shaft is set as desired; and
a passage for supplying hydraulic oil into said fluid coupling working chamber, wherein said passage includes:
(a) a switching valve means selectably operable for fully opening and closing rapidly, and
(b) a bypass passage having an oil control orifice, which bypasses said switching valve means for selectively and rapidly changing the rotational speed of said driven shaft from a lowest speed to a highest speed or vice versa.

9. A quick acceleration fluid coupling according to claim 8, wherein a plurality of small notches are provided in an innermost periphery of said dam.

10. A quick acceleration fluid coupling according to claim 9, wherein said notches are each semicircular in shape and are positioned symmetrically with respect to a center of said dam.

11. A quick acceleration fluid coupling used for a pump for a descaling apparatus, comprising:
a fluid coupling working chamber including,
(a) an impeller attached to a driving shaft,
(b) a runner attached to a driven shaft, and
(c) an impeller casing attached to said impeller and surrounding said runner, said impeller casing including an oil discharge nozzle for discharging oil from said fluid coupling working chamber to the outside thereof;
a passage for supplying hydraulic oil into said fluid coupling working chamber, wherein said passage includes,
(a) a switching valve means selectably operable for fully opening and closing rapidly, and
(b) a bypass passage having an oil control orifice, which bypasses said switching valve means; and
a dam provided on an inner surface of said impeller casing inwardly of said oil discharge nozzle for setting the lowest rotational speed of said driven shaft, wherein the height of said dam is set so that a driving machine of said coupling does not exceed its load carrying capacity limit due to acceleration torque generated when the rotational speed of said driven shaft is changed from its lowest to highest speed.

12. A quick acceleration fluid coupling used for a pump for a descaling apparatus, comprising:
a fluid coupling working chamber including,
(a) an impeller attached to a driving shaft,
(b) a runner attached to a driven shaft, and
(c) an impeller casing attached to said impeller and surrounding said runner; and
a passage for supplying hydraulic oil into said fluid coupling working chamber, wherein said passage includes a switching valve means selectably operable for fully opening and closing rapidly and a bypass passage having an oil control orifice, which bypasses said switching valve means, and further wherein said switching valve means sets a rate of supply of oil into said working chamber so that a driving machine does not exceed its load carrying capacity limit due to acceleration torque generated when the rotational speed of said driven shaft is changed rapidly from its lowest to its highest speed according to the operation of said switching valve means.

* * * * *